US008096135B2

(12) United States Patent
Caples

(10) Patent No.: US 8,096,135 B2
(45) Date of Patent: Jan. 17, 2012

(54) PURE AIR BLAST FUEL INJECTOR

(75) Inventor: Mark A. Caples, Ankeny, IA (US)

(73) Assignee: Dela Van Inc, West Des Moines, IA (US)

( * ) Notice: Subject to any disclaimer, the term of this patent is extended or adjusted under 35 U.S.C. 154(b) by 925 days.

(21) Appl. No.: 12/115,579

(22) Filed: May 6, 2008

(65) Prior Publication Data
US 2009/0277176 A1 Nov. 12, 2009

(51) Int. Cl.
F02C 7/26 (2006.01)
F02C 1/00 (2006.01)

(52) U.S. Cl. .............................. 60/776; 60/748; 60/741

(58) Field of Classification Search .................... 60/737, 60/741, 742, 743, 748, 778, 39.463, 739
See application file for complete search history.

(56) References Cited

U.S. PATENT DOCUMENTS

| 1,875,457 | A | | 9/1932 | Hemmingsen |
| 5,016,443 | A | * | 5/1991 | Shimizu et al. ................. 60/737 |
| 5,570,580 | A | | 11/1996 | Mains |
| 6,523,350 | B1 | | 2/2003 | Mancini et al. |
| 6,547,163 | B1 | | 4/2003 | Mansour et al. |
| 6,622,488 | B2 | | 9/2003 | Mansour et al. |
| 6,672,066 | B2 | | 1/2004 | Wrubel et al. |
| 6,688,534 | B2 | | 2/2004 | Bretz |
| 6,718,770 | B2 | | 4/2004 | Laing et al. |
| 6,755,024 | B1 | | 6/2004 | Mao et al. |
| 7,779,636 | B2 | * | 8/2010 | Buelow et al. ................. 60/742 |
| 2003/0221429 | A1 | | 12/2003 | Laing et al. |
| 2004/0148937 | A1 | | 8/2004 | Mancini |
| 2004/0148938 | A1 | | 8/2004 | Mancini et al. |
| 2007/0163263 | A1 | | 7/2007 | Thomson |

FOREIGN PATENT DOCUMENTS

| EP | 1750056 | 2/2007 |
| GB | 2374406 | 10/2002 |
| GB | 2404976 | 2/2005 |

OTHER PUBLICATIONS

Uk Search Report dated May 23, 2007 for GB0700228.0.
Uk Search Report dated Apr. 14, 2008 for GB0801660.2.
Arthur H. Lefebvre, Atomization and Sprays, Chapter 6, Hemisphere Publishing Corporation New York Washington Philadelphia London, 1989, pp. 201-272.
Arthur H. Lefebvre, Gas Turbine Combustion, Chapter 10 Hemisphere Publishing Corporation Washington New York London, 1983, pp. 371-461.

* cited by examiner

Primary Examiner — Ehud Gartenberg
Assistant Examiner — Arun Goyal
(74) Attorney, Agent, or Firm — Scott D. Wofsy; Edwards Wildman Palmer LLP

(57) ABSTRACT

An air blast fuel injector for a gas turbine engine includes an elongate feed arm having an inlet fitting for receiving fuel and for distributing the fuel to first and second fuel delivery conduits extending through the feed arm. A nozzle body is operatively connected to the feed arm. The nozzle body includes an on-axis inner air circuit and fuel circuitry radially outboard of the inner air circuit for delivering fuel to a fuel swirler outboard of the inner air circuit. The fuel circuitry includes a first fuel circuit configured and adapted to deliver fuel to the fuel swirler from the first fuel conduit of the feed arm and a second fuel circuit configured and adapted to deliver fuel to the fuel swirler from the second fuel conduit of the feed arm.

20 Claims, 7 Drawing Sheets

PURE AIR BLAST FUEL INJECTOR

BACKGROUND OF THE INVENTION

1. Field of the Invention

The present invention relates to fuel injectors and nozzles, and more particularly, to pure airblast fuel injectors and nozzles for gas turbine engines.

2. Description of Related Art

Pure airblast nozzles are in wide use among engine manufacturers, particularly in aircraft engines. Pure airblast nozzles create favorable air/fuel mixtures and have spray characteristics that produce combustion qualities desirable for low emissions and high engine efficiencies. A typical pure airblast injector has one fuel circuit. Fuel can be directed from an injector inlet fitting to a fuel swirler through a fuel tube. At the fuel swirler, the fuel can be split into a multitude of discrete paths, all of which discharge into the combustor. These discrete paths are all fluidly connected and are thus all part of a single fuel circuit.

One example of a pure airblast fuel injector is described in U.S. Pat. No. 6,622,488 to Mansour, et al., which shows a fuel injector having a pure airblast nozzle connected to a housing stem. The fuel nozzle includes a fuel swirler that has a plenum for receiving fuel from a conduit in the housing stem. A plurality of fuel passages conduct fuel from the plenum to discharge orifices. The downstream ends of the passages are angled so as to impart swirl on fuel exiting therethrough. A prefilmer surrounds the fuel swirler. Fuel exiting the swirler is directed inwardly by the prefilmer. An inner air passage extends through the center of the fuel swirler and an outer air passage is defined outboard of the prefilmer. The inner and outer air passages include air swirlers for imparting swirl to compressor discharge air flowing therethrough. As fuel exits the swirler/prefilmer, it is sheared between the swirling air flows issuing from the inner and outer air passages to atomize the fuel for combustion.

While pure airblast nozzles can provide for clean fuel combustion when the engine compressor is spooled up, difficulties can arise during engine startup. Pure airblast nozzles depend on fast moving air to break up the slower moving fuel spray into fine droplets. As described above, the airblast typically comes from compressor discharge air routed through the nozzle. However, during engine startup the compressor is not fully spooled up and thus the air pressures provided to the nozzle during engine startup are not always high enough to provide the necessary atomizing air blast. Therefore, the amount of fuel atomized can be insufficient to initiate or sustain ignition. Thus it can be quite difficult to start an engine using only traditional pure air blast nozzles.

Another problem during startup for traditional airblast nozzles is that when the startup air pressure is too low to filly atomize the fuel flowing from the nozzle, significant amounts of fuel can issue from the nozzle without being atomized. Liquid fuel drooling from the nozzle constitutes waste of fuel and can cause poor emissions as well as complications that can arise from fuel pooling in undesirable locations of the engine. Pooled fuel can ignite explosively and emit a plume of white smoke out of the exhaust.

Some solutions to these problems have been suggested, such as including auxiliary start nozzles, for example liquid-pressure atomizing nozzles, dedicated for use during start up. Other solutions include adding auxiliary air pumps or compressors to generate atomizing air blasts through pure airblast nozzles during engine start up. It is also known to use hybrid nozzles, which include air blast fuel nozzles for fall power operation in addition to liquid-pressure atomizing nozzles for use during startup. However, while these solutions can be used to facilitate engine start up, they can also add significantly to the cost and weight of the engine.

Piloted airblast nozzles are sometimes used to achieve the needed starting characteristics while trying to match pure airblast nozzle performance. However, piloted airblast nozzles tend to lack the superior thermal management inherent in pure airblast nozzles. Piloted airblast nozzles also fail to achieve identical spray characteristics with pure airblast nozzles because the pressure atomizing circuit mixes with the airblast spray.

Such conventional methods and systems generally have been considered satisfactory for their intended purpose. However, there still remains a continued need in the art for a nozzle or fuel injector that allows for improved startup performance and provides the benefits of pure airblast atomization. There also remains a need in the art for such a nozzle or injector that is easy to make and use. The present invention provides a solution for these problems.

SUMMARY OF THE INVENTION

The subject invention is directed to a new and useful air blast fuel injector for a gas turbine engine. The fuel injector includes an elongate feed arm having an inlet fitting for receiving fuel and for distributing the fuel to first and second fuel delivery conduits extending through the feed arm. A nozzle body is operatively connected to the feed arm. The nozzle body includes an on-axis inner air circuit and fuel circuitry radially outboard of the inner air circuit for delivering fuel to a fuel swirler outboard of the inner air circuit. The fuel circuitry includes a first fuel circuit configured and adapted to deliver fuel to the fuel swirler from the first fuel conduit of the feed arm and a second fuel circuit configured and adapted to deliver fuel to the fuel swirler from the second fuel conduit of the feed arm.

In one embodiment, a check valve is provided in fluid communication with the second fuel conduit of the feed arm. The check valve is configured and adapted to allow fuel to flow in the second fuel conduit when fuel pressure at the inlet fitting of the injector exceeds a predetermined threshold pressure. It is contemplated that at least part of the second fuel conduit can be coaxial with the first fuel conduit.

It is also envisioned that the first fuel circuit of the nozzle body can include a plurality of first fuel passages, the second fuel circuit of the nozzle body can include a plurality of second fuel passages, wherein the first and second fuel passages are defined on a radially outward surface of the fuel swirler. A fuel prefilmer can be provided outboard of the fuel swirler, including first and second openings therethrough for supplying fuel from the first and second conduits of the feed arm into the first and second fuel passages of the nozzle body, respectively. It is also contemplated that each of the first fuel passages can include a first fuel inlet in fluid communication with a first opening through the prefilmer and a fuel outlet in fluid communication with a fuel outlet of the nozzle body. In one such embodiment, each of the second fuel passages extends between the outlet of the nozzle body and a common fuel inlet in fluid communication with a second opening through the prefilmer. One of the second fuel passages can extend between each circumferentially adjacent pair of first fuel passages.

In other embodiments having first and second fuel passages, each of the first and second fuel passages is in fluid communication with a fuel outlet of the nozzle body through a metering slot that is angled with respect to a central axis of the nozzle body. Each metering slot is configured and adapted to impart swirl to a stream of fuel flowing therethrough in a first swirl direction. Each metering slot can be angled about 45° with respect to the central axis, can be angled between about 30° and about 60° with respect to the central axis, or can be arranged to have any other suitable angle. In certain other embodiments, an inner air swirler is provided within the inner air circuit, wherein the inner air swirler is configured and adapted to impart swirl on a flow of air therethrough in a second swirl direction that is counter-rotational with the first swirl direction of the metering slots of the first and second fuel passages. It is also contemplated that the second swirl direction can be co-rotational with the first swirl direction.

The invention also provides an air blast fuel nozzle for a gas turbine engine. The fuel nozzle includes a nozzle body defining an on-axis inner air circuit, a fuel swirler radially outboard of the inner air circuit, a prefilmer radially outboard of the fuel swirler, and first and second fuel circuits defined between the fuel swirler and prefilmer. The first and second fuel circuits are configured and adapted to conduct fuel from first and second fuel sources, respectively, to a common prefilming chamber defined between the fuel swirler and the prefilmer.

The first fuel circuit can include a plurality of first fuel passages, the second fuel circuit can include a plurality of second fuel passages, and the first and second fuel passages can be defined on a radially outward surface of the fuel swirler. The prefilmer can include primary and secondary openings therethrough for supplying fuel to the first and second fuel passages, respectively. In certain embodiments, each of the first fuel passages includes a primary fuel inlet in fluid communication with a primary opening through the prefilmer and a primary fuel outlet in fluid communication with the prefilming chamber. Each of the second fuel passages can extend between the prefilming chamber and a common secondary fuel inlet in fluid communication with a secondary opening of the prefilmer. It is also contemplated that each of the first fuel passages can be in fluid communication with the prefilming chamber through a fluid metering slot that is dimensioned to perform fuel pressure atomization on fuel flowing therethrough.

The invention also provides a method of supplying fuel to a gas turbine engine during startup. The method includes providing a fuel injector having an elongate feed arm with an inlet fitting for receiving fuel and for distributing the fuel to first and second fuel delivery conduits extending through the feed arm. The injector also includes a nozzle body operatively connected to the feed arm, the nozzle body having an on-axis inner air circuit and fuel circuitry radially outboard of the inner air circuit for delivering fuel to a fuel swirler outboard of the inner air circuit, the fuel circuitry including a first fuel circuit configured and adapted to deliver fuel to the fuel swirler from the first fuel conduit of the feed arm, and a second fuel circuit configured and adapted to deliver fuel to the fuel swirler from the second fuel conduit of the feed arm. The method further includes supplying fuel through the first fuel conduit of the feed arm and through the first fuel circuit in the fuel nozzle body to provide a limited flow of fuel for combustion responsive to compressor pressure below a predetermined threshold. The method also includes supplying fuel through the second fuel conduit in the feed arm and through the second fuel circuit in the fuel nozzle body to provide a flow of fuel for combustion responsive to compressor pressure above the predetermined threshold.

These and other features of the systems and methods of the subject invention will become more readily apparent to those skilled in the art from the following detailed description of the preferred embodiment taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENT

Figure 1:
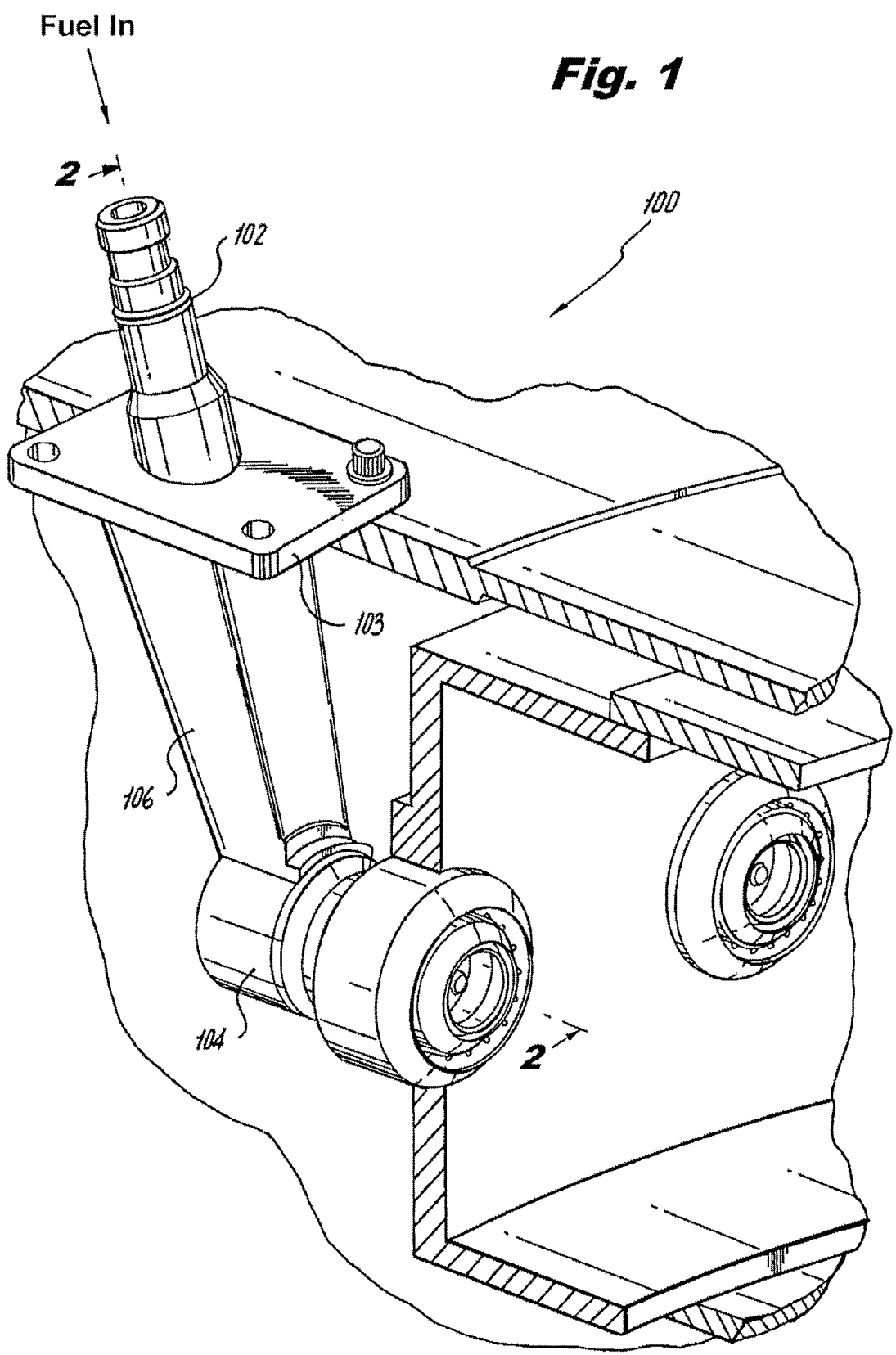
FIG. 1 is a perspective view of an airblast fuel injector constructed in accordance with the present invention, showing the inlet fitting and the nozzle body depending from the feed arm in the setting of an annular combustor.

Reference will now be made to the drawings wherein like reference numerals identify similar structural features or aspects of the subject invention. For purposes of explanation and illustration, and not limitation, a partial view of an exemplary embodiment of the injector in accordance with the invention is shown in FIG. 1 and is designated generally by reference character 100. Other embodiments of injectors and nozzles in accordance with the invention, or aspects thereof, are provided in FIGS. 2-3 and 5-9, as will be described. The system of the invention can be used in gas turbine engines, or in any other suitable application, for enhanced fuel atomization during engine start up and sustained stable combustion.

Figure 2:
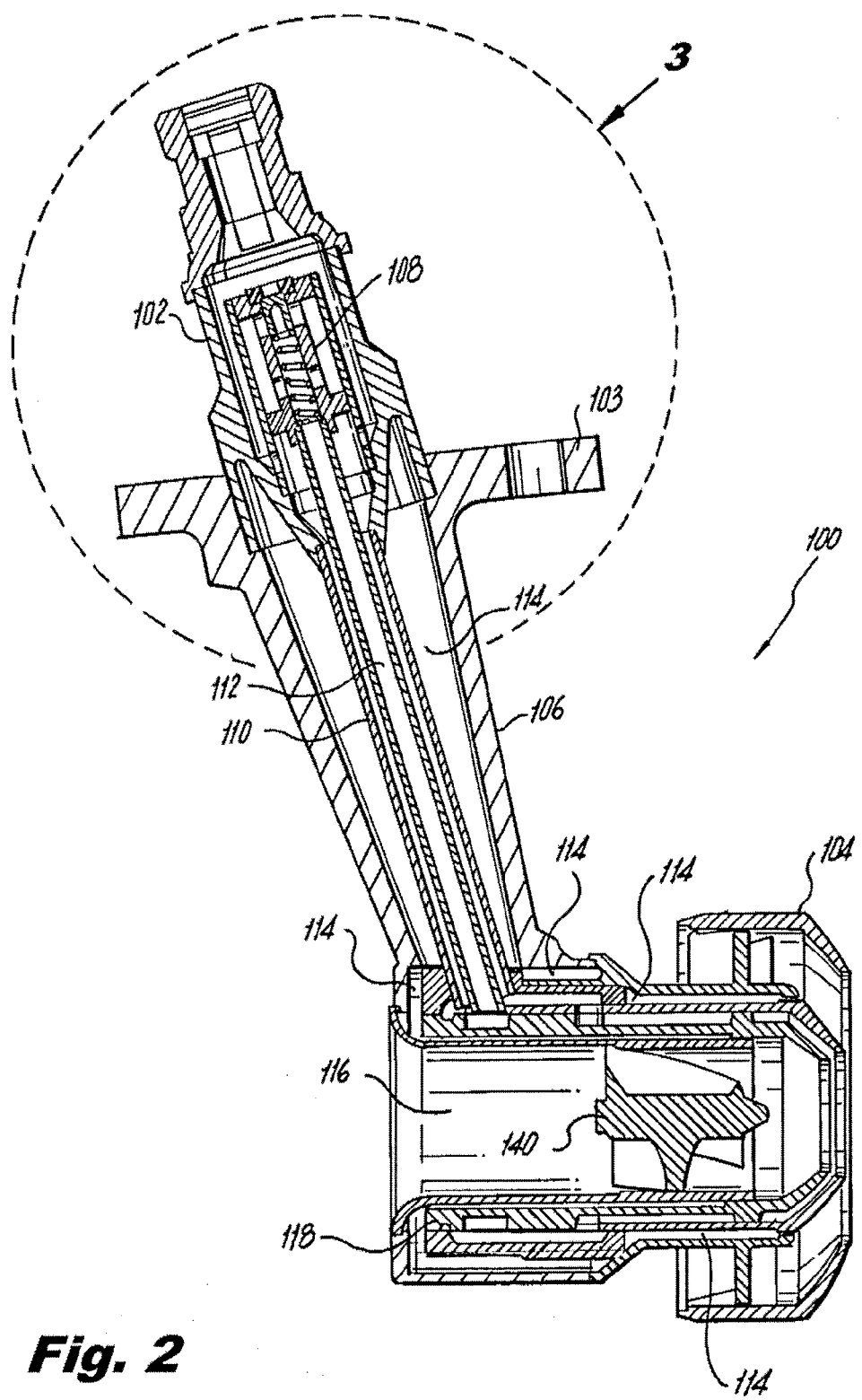
FIG. 2 is a cross-sectional side elevation view of the fuel injector of FIG. 1, showing the first and second fuel circuits from the inlet fitting to the nozzle outlet.

As shown in FIG. 1, injector 100 includes a fuel inlet fitting 102 and a nozzle body 104 connected to each other by a feed arm 106. Fuel inlet fitting 102 is provided at an upstream end of injector 100 for receiving fuel to be atomized for combustion and includes a mounting flange 103 for attaching injector 100 within a gas turbine engine. As shown in FIG. 2, fuel inlet fitting 102 includes and a check valve 108 for distributing fuel from inlet fitting 102 to first conduit 110 and second conduit 112 running through feed arm 106 to nozzle body 104. An optional insulative gap 114 is provided between conduit 110 and the outer wall of feed arm 106, which can be filled with air, noble gases, a vacuum, or any other suitable form of insulation to insulate fuel in conduits 110/112 from the high temperatures outside feed arm 106.

With continued reference to FIG. 2, nozzle body 104 is operatively connected to feed arm 106 to receive fuel from conduits 110/112. Nozzle body 104 includes an on-axis inner air circuit 116. Fuel circuitry radially outboard of inner air circuit 116 is provided for delivering fuel from conduits 110/112 to fuel swirler 118 outboard of inner air circuit 116. The fuel circuitry includes a first or starter fuel circuit configured and adapted to deliver fuel to fuel swirler 118 from first fuel conduit 110 of feed arm 106 and a second fuel circuit configured and adapted to deliver fuel to fuel swirler 118 from second fuel conduit 112 of feed arm 106. Insulative gaps 114 are formed in suitable portions of nozzle body 104 inboard and outboard of fuel swirler 118 to reduce or prevent the occurrence of fuel coking within nozzle body 104.

Figure 3:
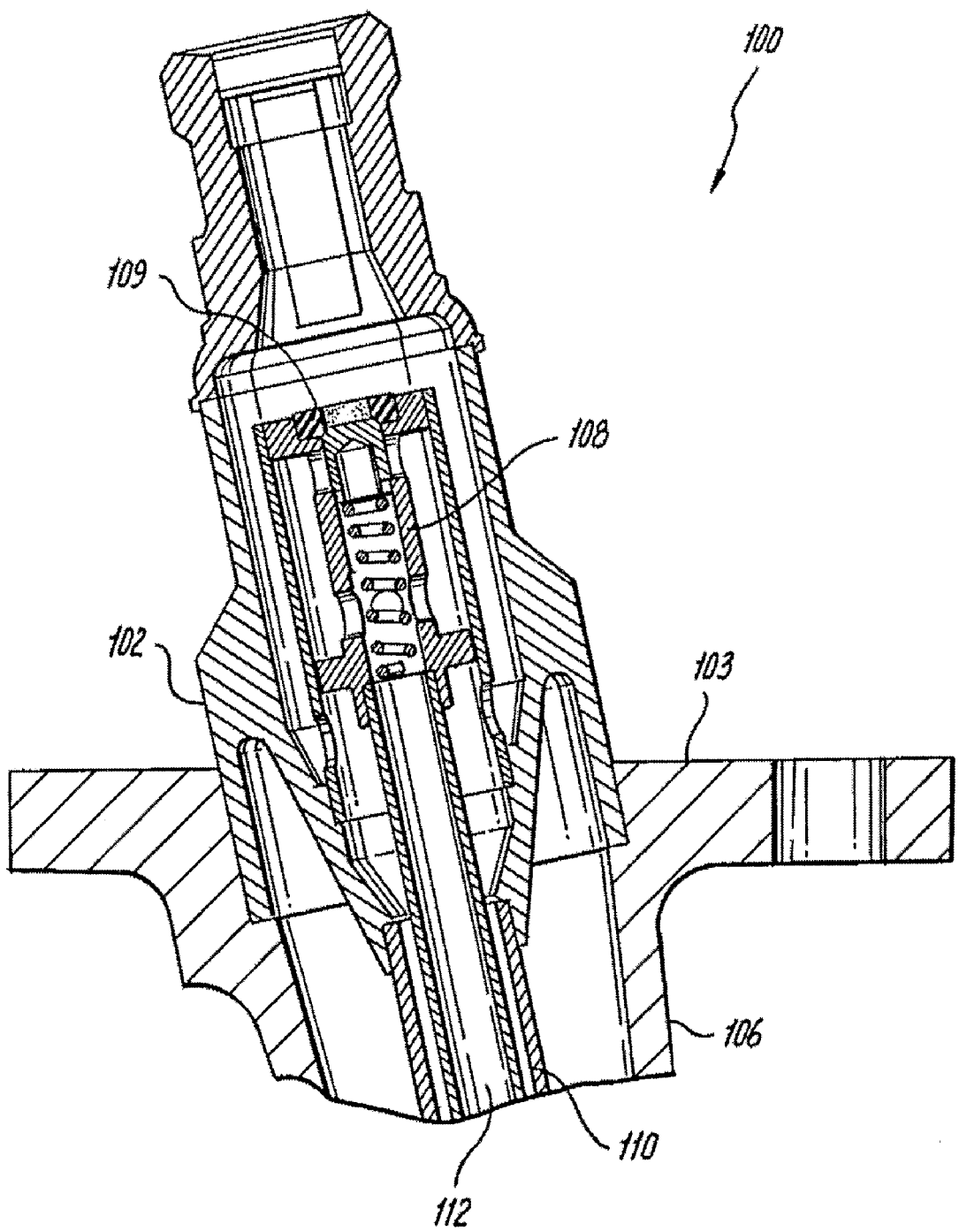
FIG. 3 is an enlarged cross-sectional side elevation view of the fuel inlet portion of the fuel injector of FIG. 2, showing a check valve for directing fuel into first and second fuel conduits of the feed arm.

As shown in FIG. 3, check valve 108 is provided in fluid communication with second fuel conduit 112 of feed arm 106. Check valve 108 is configured and adapted to prevent fuel from flowing in second conduit 112 during engine startup when fuel and air pressures are low. Fuel and air pressures generally rise as a gas turbine engine starts up. When fuel pressure at the inlet of check valve 108 exceeds a predetermined threshold, spring loaded check 109 of check valve 108 is configured to crack or open to allow fuel to flow through second fuel conduit 112. Below the threshold pressure, check valve 108 is configured to remain closed and fuel must pass around check valve 108 into first conduit 110. Check valve 108 can be a simple check valve, or a double acting check valve to prevent flow through first conduit 110 until a predetermined pressure is reached while still providing the staging function.

Check valve 108 is advantageous because it can automatically stage fuel flow through first and second fuel circuits of injector 100 based on the pressure of a single pressurized supply of fuel from outside injector 100. However, those skilled in the art will readily appreciate that check valve 108 is optional, since conduits 110/112 can each have a separate inlet at inlet fitting 102 for receiving fuel from first and second fuel sources at inlet fitting 102, respectively, if means such as a manifold and/or control system are provided external to injector 100 for staging or controlling flow of fuel to the individual fuel circuits. This could allow for fuel staging in the first and/or second fuel circuits for low power conditions other than start up, such as during flight for an aircraft. Moreover, those skilled in the art will readily appreciate that at least one additional check valve can be used to stop flow through the first fuel circuit when the fuel pressure at inlet fitting 102 is below a minimum amount, such as when the engine is not operating.

By operation of check valve 108, only a relatively small volume of fuel passes through first conduit 110 to nozzle body 104 during engine start up. After the engine has developed sufficient fuel and air pressure, the fuel pressure at inlet 102 opens check valve 108 so fuel can flow through both conduits 110/112 at a time. Those skilled in the art will appreciate that it is also possible to use a check valve configuration that switches between conduits 110/112, so that only one conduit at a time supplies fuel through nozzle body 104.

While first conduit 110 and second conduit 112 are shown as being in a concentric configuration, those skilled in the art will readily appreciate that it is also possible for second conduit 112 to be outside first conduit 110, for the conduits to be separate from one another, side by side, or any other suitable configuration that will allow delivery of fuel separately to first and second fuel circuits. Moreover, fuel conduits 110/112 can be fixed at both ends, or may be free to slide as long as there is a fluid tight seal to prevent fuel from escaping the proper conduit 110/112. It is also contemplated that instead of two tubes, e.g. conduits 110/112, situated inside of an insulating support, the fuel path can be defined by holes formed directly in the support, e.g. arm 106, or by one tube inside a larger hole formed directly in the arm to provide two substantially concentric conduits.

Figure 4:
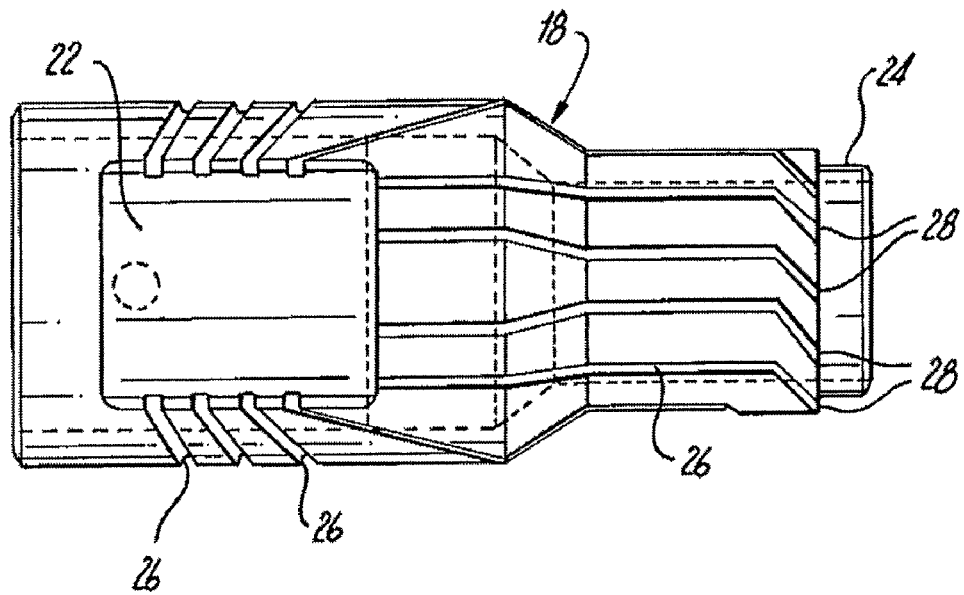
FIG. 4 is a plan view of a prior art fuel swirler, showing a single fuel circuit including a plurality of fuel passages defined on the outer surface of the fuel swirler.

FIG. 4 shows a fuel swirler 18 that is characteristic of known pure airblast nozzle swirlers. Fuel swirler 18 has a part of a single fuel circuit defined on its outer surface. This includes inlet or plenum 22 and outlet 24, which are connected to one another by means of a plurality of fuel passages 26. Fuel passing from plenum 22 passes into passages 26 and through metering orifices 28 in order to reach outlet 24. Since all of the fuel passages 26, plenum 22, orifices 28, and outlet 24 are part of the same fuel circuit, swirler 18 is prone to start up difficulties including drooling and problematic light off, as described above.

Figure 5:
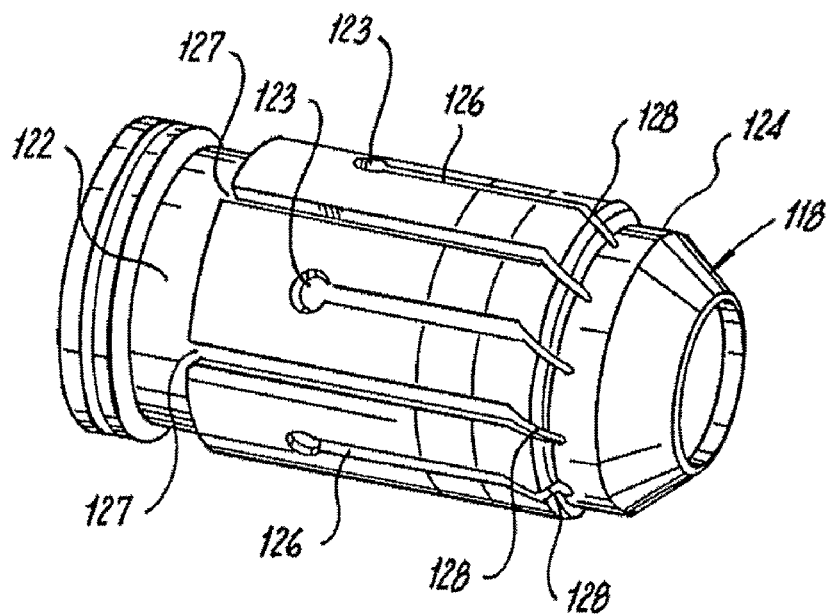
FIG. 5 is a perspective view of a fuel swirler of the fuel injector of FIG. 1, showing portions of two fuel circuits defined on the outer surface of the swirler.

With reference now to FIG. 5, fuel swirler 118 of injector 100 provides passages for two separate fuel circuits. The first fuel circuit includes a plurality of first fuel passages 126 defined on the outer diametrical surface of fuel swirler 118. The second fuel circuit includes a plurality of second fuel passages 127 defined on the radially outward surface of fuel swirler 118. Each of the first fuel passages 126 includes a separate first fuel inlet 123 and is in fluid communication with outlet 124 of swirler 118. Each of the second fuel passages 127 extends between outlet 124 and a common fuel inlet 122.

One of the second fuel passages 127 extends between each circumferentially adjacent pair of first fuel passages 126 making a circumferential pattern in which every other passage is a first passage 126 and every other passage is a second passage 127. However, this configuration is optional and those skilled in the art will readily appreciate that any circumferential ordering of the fuel passages around swirler 118 can be used without departing from the spirit and scope of the invention.

Figure 6:
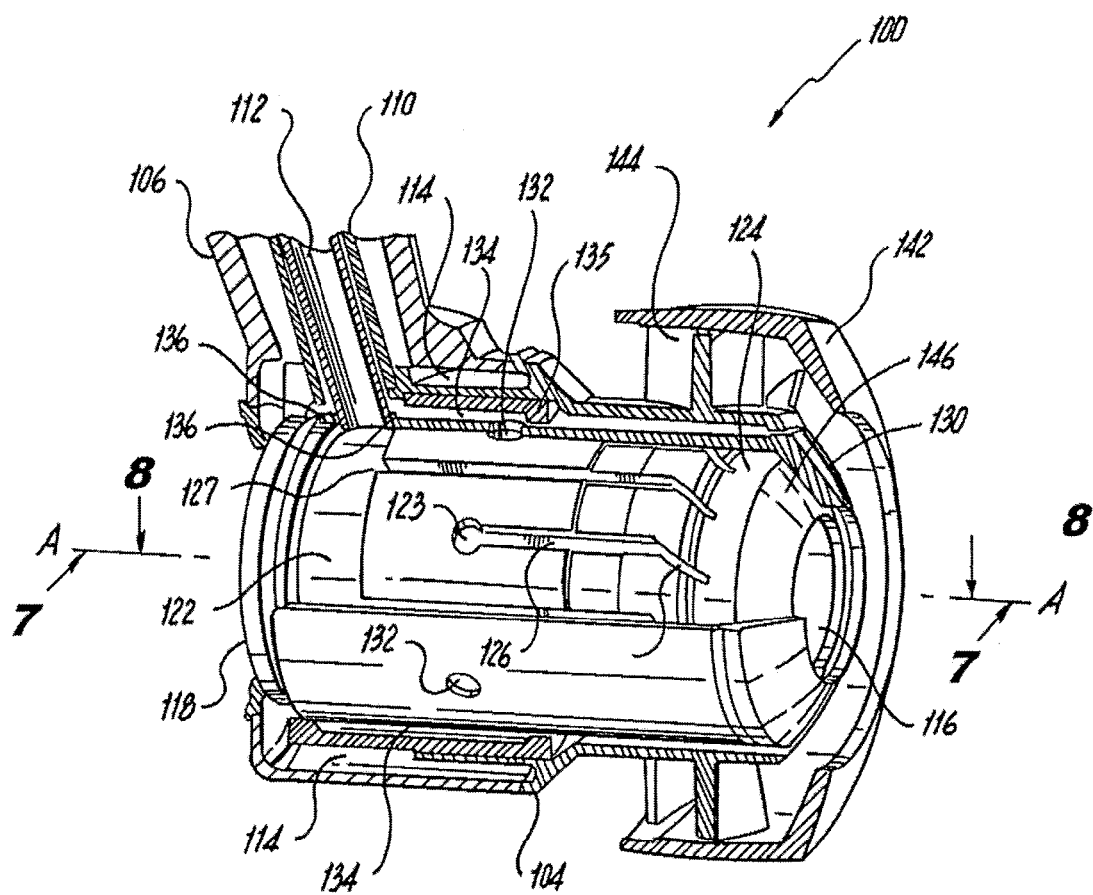
FIG. 6 is a cut-away perspective view of the nozzle body of the fuel injector of FIG. 1, showing the fuel swirler inboard of the prefilmer and outer air circuit.

FIG. 6 shows fuel swirler 118 within nozzle body 104 in a partially cut-away view. A fuel prefilmer 130 is provided outboard of fuel swirler 118. Prefilmer 130 includes a set of first openings 132 therethrough for supplying fuel from first conduit 10 of feed arm 106 into fuel passages 126 of the first fuel circuit. Each of the first openings 132 corresponds to a single first inlet 123 of one of the first fuel passages 126. An intermediate passage 134 defined between connector 135 and prefilmer 130 fluidly connects first conduit 110 to first prefilmer openings 132. While common inlet 122 of second fuel passages 127 is shown as wrapping substantially all the way around fuel swirler 118, it is also possible to use a fuel inlet chamber that does not extend fully around swirler 118, wherein the second fuel passages could converge into the inlet chamber located, for example in the area of swirler 118 immediately adjacent the outlet of second conduit 112.

Figure 7:
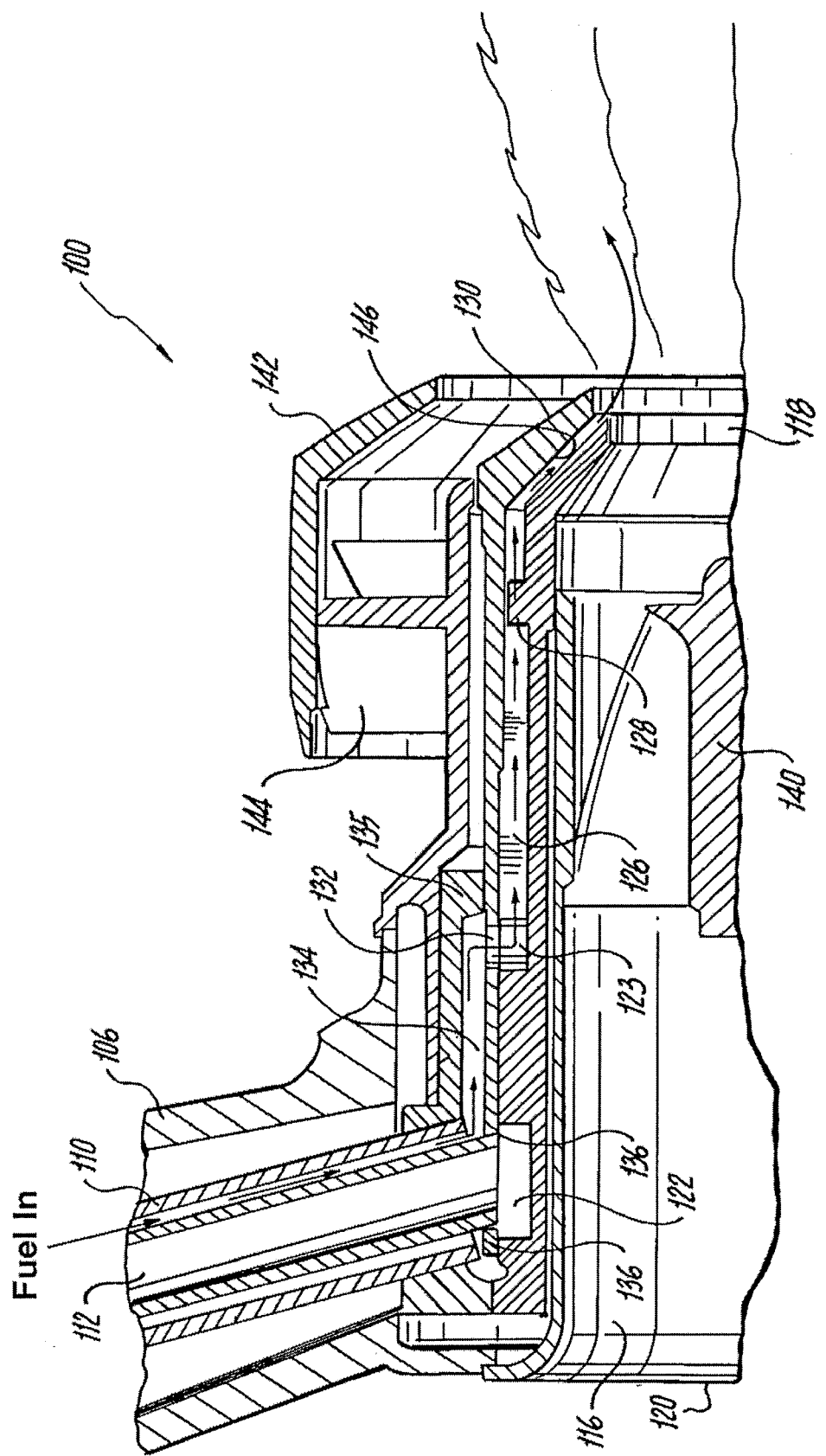
FIG. 7 is a cross-sectional side elevation view of a portion of the nozzle body of FIG. 6, showing the path of fuel flowing through the primary fuel circuit in the fuel swirler.
Figure 8:
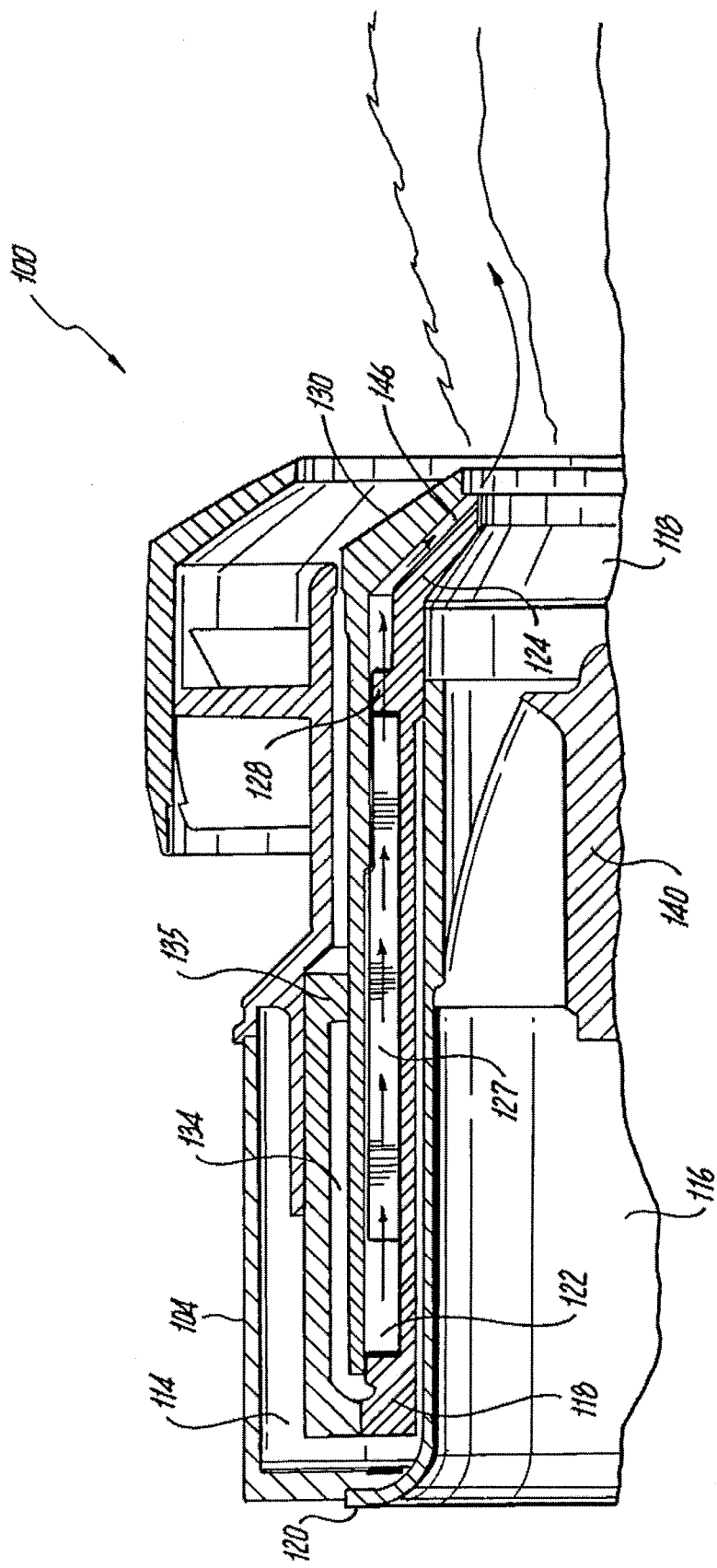
FIG. 8 is a cross-sectional side elevation view of a portion of the nozzle of FIG. 6, showing the path of fuel flowing through the secondary fuel circuit in the fuel swirler.

As indicated by flow arrows in FIG. 7, fuel can flow through the first fuel circuit including first conduit 110, intermediate passage 134, prefilmer openings 132, inlets 123, and fuel passages 126. Prefilmer 130 also includes a second opening 136 that puts second conduit 112 in fluid communication with inlet 122. When the second fuel circuit is active, fuel can also flow from second conduit 112, through second prefilmer opening 136, into inlet 122. From there, the fuel can flow through passages 127, as indicated by arrows in FIG. 8. While the fuel passages of the first and second fuel circuits are shown as being defined on the outer diametrical surface of fuel swirler 118, the fuel passages could also be defined at least in part on the radially inner surface of prefilmer 130, or any other suitable configuration so as to be between swirler 118 and prefilmer 130.

Prefilmer 130 includes a converging exit portion that forms a prefilming exit chamber 146 with the exit portion 124 of swirler 118. Both fuel circuits are connected to supply fuel into common prefilming chamber 146. Swirling fuel exiting nozzle body 104 is directed radially inward as it passes through prefilming chamber 146. Those skilled in the art will appreciate that while prefilmer 130 converges toward the fuel exit, any other suitable nozzle exit configuration can be used without departing from the spirit and scope of the invention.

With reference again to FIG. 6, each of the first and second fuel passages 126/127 is in fluid communication with fuel outlet 124 of nozzle body 104 through a metering slot 128. Metering slots 128 are arranged circumferentially around fuel swirler 118 to provide a uniform spray. Each metering slot 128 is configured and adapted to impart swirl to a stream of fuel flowing therethrough in a first swirl direction by being angled with respect to central axis A. Each metering slot 128 can be angled 45° with respect to central axis A, can be angled between about 30° and about 60° with respect to central axis A, or can be arranged at any other suitable angle. While all of the metering slots 128 are depicted as having the same swirl angel with respect to axis A, it is also possible for slots 128 of first passages 126 to have a different angle than slots 128 of second passages 127.

Slots 128 are shown having identical configurations for both first passages 126 and second passages 127, however it is also possible for slots 128 of first passages 126 to have characteristics different from slots 128 of second passages 127, or for all of slots 128 to have different characteristics from one another. The number, size, and spacing of slots 128 for first passages 126 can be tailored to meet starting requirements for a given engine design through engine test stand tests or other suitable methods. It is also contemplated that the metering slot 128 of each of the first fuel passages 126 can be dimensioned to perform fuel pressure atomization on fuel flowing therethrough. This is advantageous during engine start up when air pressures are insufficient to fully atomize fuel from the first fuel circuit. If metering slot 128 is configured for fuel pressure atomization, the atomizing pressure should be low enough, e.g. around 20-30 psi which can vary from application to application, to allow for a simple check valve, e.g. 108, to properly operate as described above. If the pressure required for pressure atomization is too high for proper functioning of check valve 108, the start circuit need not employ pressure atomization, but can rater be configured to minimize flow area enough to provide fast moving fuel that tends to atomize rather than drooling from nozzle body 104. Those skilled in the art will readily appreciate that slots 128 can be, but are not required to be, configured for use in pressure atomization with out departing from the spirit and scope of the invention.

As shown in FIGS. 6 and 7, nozzle body 104 includes inner air passage or circuit 116 defined by an inner heat shield 120 inboard of swirler 118 on axis A. An inner air swirler 140 is provided within inner air circuit 116. Inner air swirler 140 is configured and adapted to impart swirl on a flow of air therethrough in a second swirl direction. An outer air passage is defined through shroud 142, including outer air swirler 144 for providing a swirling airflow outboard of fuel issuing from fuel swirler 118 and air issuing from inner air passage 116. Those skilled in the art will readily appreciate that inner heat shield 120 is optional and that multiple inner air passages and/or multiple outer air passages can be provided.

Inner and outer swirlers 140/144 are optional, as the respective air passages can be used with or without air swirl. While it is advantageous for at least one of inner air swirler 140, outer air swirler 144, and fuel swirler 118 to be counter-rotational with the others, those skilled in the art will readily appreciate that co-rotational configurations can also be used. Moreover, while inner air swirler 140 and outer air swirler 144 are shown as axial air swirlers, it is also possible to use radial swirlers, or any other suitable type of swirler without departing from the spirit and scope of the invention.

While described herein in the context of injector 100, those skilled in the art will readily appreciate that nozzle body 104 includes a nozzle that can be used with or without feed arm 106 and inlet fitting 102. Nozzle body 104 can be configured to be used as a fuel nozzle with any suitable injector or inlet fitting as long as fuel is supplied to its fuel circuits in such a way as to stage fuel through the respective fuel circuits to limit fuel flow during start up.

The invention also includes a method of supplying fuel to a gas turbine engine during startup. The method includes providing a fuel injector (e.g. injector 100 as described above). The method further includes supplying fuel through a first fuel conduit (e.g. conduit 110) of a feed arm (e.g. feed arm 106) of the injector and through a first fuel circuit in the fuel nozzle body (e.g. nozzle body 104) to provide a limited flow of fuel for combustion responsive to compressor pressure below a predetermined threshold. During engine start up, when fuel and air pressures are generally low, fuel flowing through only the first fuel circuit allows for limited fuel supply for ignition, while reducing or preventing drooling of fuel by holding back fuel flow from a second fuel circuit.

The method also includes supplying fuel through the second fuel conduit (e.g. conduit 112) in the feed arm (e.g. feed arm 106) and through the second fuel circuit in the fuel nozzle body (e.g. nozzle body 104) to provide a flow of fuel for combustion responsive to compressor pressure above the predetermined threshold. After the engine has reached adequate fuel and air pressures, a check valve (e.g. check valve 108) or other fuel staging means can open fuel flow through the second fuel circuit to allow full power operation of the engine. It is also contemplated that the fuel circuits can be purged when inactive, for example by means of a pressurized air blast, if such is desirable to prevent or reduce fuel coking within the fuel circuitry.

In summary, the invention provides methods and devices including an air blast fuel injector for a gas turbine engine having an elongate feed arm and an inlet fitting for receiving fuel and for distributing the fuel to first and second fuel delivery conduits extending through the feed arm. A nozzle body is operatively connected to the feed arm. The nozzle body includes an on-axis inner air circuit and fuel circuitry radially outboard of the inner air circuit for delivering fuel to a fuel swirler outboard of the inner air circuit. The fuel circuitry includes a first fuel circuit configured and adapted to deliver fuel to the fuel swirler from the first fuel conduit of the feed arm and a second fuel circuit configured and adapted to deliver fuel to the fuel swirler from the second fuel conduit of the feed arm.

The devices and methods described above provide the advantages of traditional pure airblast injector air/fuel mixtures and spray characteristics while reducing or eliminating complications of engine start up caused by traditional pure airblast injectors including fuel drooling, incomplete atomization, fuel pooling, and other related problems. Moreover, those skilled in the art will readily appreciate that the nozzles and injectors of the present invention can be configured to have the same external dimensions and configurations as existing pure airblast fuel injectors and nozzles. This allows for injectors and nozzles of the present invention to be interchangeable with existing pure airblast injectors and nozzles without the need for significant modifications to existing combustors or other engine components. While it is possible to use the injectors and nozzles of the present invention in place of and in much the same manner as traditional single stage injectors and nozzles, those skilled in the art will readily appreciate the improved functionality provided by multiple stages.

The methods and systems of the present invention, as described above and shown in the drawings, provide for an air blast fuel injector with superior properties including improved atomization and uniform spray patternation at low flow rates, such as during engine start up. This improved atomization leads to improved emissions and operability. Moreover, the injectors and nozzles described herein provide for improved light-around and pattern factor uniformity without costly upgrades to nozzles, fuel circuits, or fuel controls of existing or newly manufactured engines.

While the apparatus and methods of subject invention have been shown and described with reference to preferred embodiments, those skilled in the art will readily appreciate that changes and/or modifications may be made thereto without departing from the spirit and scope of the subject invention.

What is claimed is:

1. An air blast fuel injector for a gas turbine engine comprising:
   a) an elongate feed arm having an inlet fitting for receiving fuel and for distributing the fuel to first and second fuel delivery conduits extending through the feed arm; and
   b) a nozzle body operatively connected to the feed arm, the nozzle body including an on-axis inner air circuit and fuel circuitry radially outboard of the inner air circuit for delivering fuel to a fuel swirler outboard of the inner air circuit, the fuel circuitry including a first fuel circuit configured and adapted to deliver fuel to the fuel swirler from the first fuel conduit of the feed arm and a second fuel circuit configured and adapted to deliver fuel to the fuel swirler from the second fuel conduit of the feed arm.

2. An air blast fuel injector as recited in claim 1, further comprising a check valve in fluid communication with the second fuel conduit of the feed arm, the check valve being configured and adapted to allow fuel to flow in the second fuel conduit when fuel pressure at the inlet fitting of the injector exceeds a predetermined threshold pressure.

3. An air blast fuel injector as recited in claim 1, wherein at least part of the second fuel conduit is coaxial with the first fuel conduit.

4. An air blast fuel injector as recited in claim 1, wherein the first fuel circuit of the nozzle body includes a plurality of first fuel passages, and wherein the second fuel circuit of the nozzle body includes a plurality of second fuel passages, wherein the first and second fuel passages are defined on a radially outward surface of the fuel swirler.

5. An air blast fuel injector as recited in claim 4, further comprising a fuel prefilmer outboard of the fuel swirler, the prefilmer including first and second openings therethrough for supplying fuel from the first and second conduits of the feed arm into the first and second fuel passages of the nozzle body, respectively.

6. An air blast fuel injector as recited in claim 5, wherein each of the first fuel passages includes a first fuel inlet in fluid communication with a first opening through the prefilmer, and wherein each of the first fuel passages includes a fuel outlet in fluid communication with a fuel outlet of the nozzle body.

7. An air blast fuel injector as recited in claim 6, wherein each of the second fuel passages extends between the outlet of the nozzle body and a common fuel inlet in fluid communication with a second opening through the prefilmer.

8. An air blast fuel injector as recited in claim 7, wherein one of the second fuel passages extends between each circumferentially adjacent pair of first fuel passages.

9. An air blast fuel injector as recited in claim 4, wherein each of the first and second fuel passages is in fluid communication with a fuel outlet of the nozzle body through a metering slot that is angled with respect to a central axis of the nozzle body, wherein each metering slot is configured and adapted to impart swirl to a stream of fuel flowing therethrough in a first swirl direction.

10. An airblast fuel injector as recited in claim 9, wherein each metering slot is angled between about 30° and about 60° with respect to the central axis.

11. An airblast fuel injector as recited in claim 10, wherein each metering slot is angled about 45° with respect to the central axis.

12. An airblast fuel injector as recited in claim 9, further comprising an inner air swirler within the inner air circuit, wherein the inner air swirler is configured and adapted to impart swirl on a flow of air therethrough in a second swirl direction that is counter-rotational with the first swirl direction of the metering slots of the first and second fuel passages.

13. An airblast fuel injector as recited in claim 9, further comprising an inner air swirler within the inner air circuit, wherein the inner air swirler is configured and adapted to impart swirl on a flow of air therethrough in a second swirl direction that is co-rotational with the first swirl direction of the metering slots of the first and second fuel passages.

14. An air blast fuel nozzle for a gas turbine engine comprising:
   a) a nozzle body defining an on-axis inner air circuit;
   b) a fuel swirler radially outboard of the inner air circuit;
   c) a prefilmer radially outboard of the fuel swirler; and
   d) first and second fuel circuits defined between the fuel swirler and prefilmer, the first and second fuel circuits being configured and adapted to conduct fuel from first and second fuel sources, respectively, to a common prefilming chamber defined between the fuel swirler and the prefilmer.

15. An air blast fuel nozzle as recited in claim 14, wherein the first fuel circuit includes a plurality of first fuel passages, wherein the second fuel circuit includes a plurality of second fuel passages, and wherein the first and second fuel passages are defined on a radially outward surface of the fuel swirler.

16. An air blast fuel nozzle as recited in claim 15, wherein the prefilmer includes primary and secondary openings therethrough for supplying fuel to the first and second fuel passages, respectively.

17. An air blast fuel nozzle as recited in claim 16, wherein each of the first fuel passages includes a primary fuel inlet in fluid communication with a primary opening through the prefilmer and a primary fuel outlet in fluid communication with the prefilming chamber.

18. An air blast fuel nozzle as recited in claim 15, wherein the second fuel passages extend between the prefilming chamber and a common secondary fuel inlet in fluid communication with a secondary opening of the prefilmer.

19. An air blast fuel nozzle as recited in claim 15, wherein the each of the first fuel passages is in fluid communication with the prefilming chamber through a fluid metering slot that is dimensioned to perform fuel pressure atomization on fuel flowing therethrough.

20. A method of supplying fuel to a gas turbine engine during startup, the method comprising:
a) providing a fuel injector including:
   i) an elongate feed arm having an inlet fitting for receiving fuel and for distributing the fuel to first and second fuel delivery conduits extending through the feed arm; and
   ii) a nozzle body operatively connected to the feed arm, the nozzle body including an on-axis inner air circuit and fuel circuitry radially outboard of the inner air circuit for delivering fuel to a fuel swirler outboard of the inner air circuit, the fuel circuitry including a first fuel circuit configured and adapted to deliver fuel to the fuel swirler from the first fuel conduit of the feed arm, and a second fuel circuit configured and adapted to deliver fuel to the fuel swirler from the second fuel conduit of the feed arm;
b) supplying fuel through the first fuel conduit of the feed arm and through the first fuel circuit in the fuel nozzle body to provide a limited flow of fuel for combustion responsive to compressor pressure below a predetermined threshold; and
c) supplying fuel through the second fuel conduit in the feed arm and through the second fuel circuit in the fuel nozzle body to provide a flow of fuel for combustion responsive to compressor pressure above the predetermined threshold.

* * * * *

UNITED STATES PATENT AND TRADEMARK OFFICE
CERTIFICATE OF CORRECTION

| | | |
|---|---|---|
| PATENT NO. | : 8,096,135 B2 | |
| APPLICATION NO. | : 12/115579 | |
| DATED | : January 17, 2012 | |
| INVENTOR(S) | : Mark A. Caples | |

It is certified that error appears in the above-identified patent and that said Letters Patent is hereby corrected as shown below:

Title Page, Item (73) should read
(73) Assignee: <u>DELAVAN INC</u>, West Des Moines, IA (US)

Signed and Sealed this
Thirteenth Day of March, 2012

David J. Kappos
*Director of the United States Patent and Trademark Office*